(12) United States Patent
Harding

(10) Patent No.: US 8,800,493 B2
(45) Date of Patent: Aug. 12, 2014

(54) ANIMAL RESTRAINT AND FEEDER APPARATUS

(71) Applicant: Jesse Harding, Statesville, NC (US)

(72) Inventor: Jesse Harding, Statesville, NC (US)

( * ) Notice: Subject to any disclaimer, the term of this patent is extended or adjusted under 35 U.S.C. 154(b) by 0 days.

(21) Appl. No.: 14/149,954

(22) Filed: Jan. 8, 2014

(65) Prior Publication Data

US 2014/0190419 A1 Jul. 10, 2014

Related U.S. Application Data

(60) Provisional application No. 61/750,100, filed on Jan. 8, 2013.

(51) Int. Cl.
*A01K 5/01* (2006.01)
*A01K 39/04* (2006.01)

(52) U.S. Cl.
CPC ............. *A01K 39/04* (2013.01); *A01K 5/0142* (2013.01)
USPC .......................... 119/61.57; 119/786; 119/791

(58) Field of Classification Search
CPC ..... A01K 5/0114; A01K 1/04; A01K 5/0142; A01K 5/01; A01K 39/04; A01K 7/005; A01K 39/00; A01K 29/00
USPC .............. 119/51.5, 51.01, 61.5, 61.53, 61.54, 119/61.57, 786, 787, 788, 791, 780
See application file for complete search history.

(56) References Cited

U.S. PATENT DOCUMENTS

| | | | | |
|---|---|---|---|---|
| 2,484,263 A | * | 10/1949 | Atkinson | 119/61.57 |
| 3,441,003 A | * | 4/1969 | Lister et al. | 119/61.53 |
| 3,661,121 A | * | 5/1972 | Zielin | 119/61.57 |
| 4,205,629 A | * | 6/1980 | Wix | 119/51.5 |
| 4,546,730 A | | 10/1985 | Holland | |
| 4,966,099 A | * | 10/1990 | Arney | 119/61.53 |
| 5,069,167 A | * | 12/1991 | Kasselman | 119/61.53 |
| 5,148,626 A | | 9/1992 | Haake, Sr. | |
| 5,165,365 A | * | 11/1992 | Thompson | 119/61.53 |
| 5,253,609 A | * | 10/1993 | Partelow et al. | 119/61.53 |
| 5,277,149 A | * | 1/1994 | East | 119/51.5 |
| 5,526,773 A | | 6/1996 | Richardson | |
| 5,628,276 A | | 5/1997 | Raposa | |
| 6,662,747 B1 | | 12/2003 | Wydra | |
| 6,860,229 B1 | * | 3/2005 | Craft | 119/61.5 |
| D505,757 S | * | 5/2005 | Wojcik et al. | D30/154 |
| 7,234,417 B2 | * | 6/2007 | Laird | 119/61.57 |
| 7,353,775 B1 | | 4/2008 | Stelmach | |
| 7,484,477 B2 | * | 2/2009 | Wojcik et al. | 119/787 |
| 7,730,852 B2 | | 6/2010 | Kramer | |
| 8,001,931 B2 | * | 8/2011 | Deese et al. | 119/61.57 |
| 2004/0216697 A1 | | 11/2004 | Wojcik et al. | |
| 2006/0249089 A1 | * | 11/2006 | Behunin | 119/61.57 |
| 2008/0011236 A1 | * | 1/2008 | Paez | 119/61.53 |
| 2010/0170447 A1 | * | 7/2010 | Pridgen, Jr. | 119/61.53 |
| 2011/0041772 A1 | * | 2/2011 | Hargrove | 119/61.57 |

* cited by examiner

*Primary Examiner* — Trinh Nguyen
(74) *Attorney, Agent, or Firm* — Buckingham, Doolittle & Burroughs, LLC

(57) ABSTRACT

An apparatus for restraining, feeding, and watering an animal is provided. The apparatus comprises a bowl assembly, a rod, a ring element, and a ground securing element. The bowl assembly comprises a base component connected to a feeder component comprising a bowl for containing food and water. The animal may be chained or leashed to the ring element which freely pivots around the rod between the bowl assembly and the ground stabilizing element when the rod is secured within the ground. The ground stabilizing element help the apparatus resist lateral forces that occur when the animal pulls on the leash, thereby keeping the rod upright.

20 Claims, 4 Drawing Sheets

ANIMAL RESTRAINT AND FEEDER APPARATUS

CROSS-REFERENCE

This application claims priority from Provisional Patent Application Ser. No. 61/750,100 filed Jan. 8, 2013.

FIELD OF THE INVENTION

This invention pertains generally to an apparatus for simultaneously restraining and providing food and/or water for an animal, and more particularly to a spill-resistant elevated animal food and water bowl with a tangle-free attachment point for engaging a pet leash or chain.

BACKGROUND

Pet owners often keep domesticated animals, such as dogs, outdoors with food and water bowls for extended periods of time. Frequently pets that must be tied up or restrained can easily wrap their leash or restraint around themselves and/or a tether point restricting their movement and creating an uncomfortable or dangerous situation for the pet. A restrained pet can become overexcited and knock over the food and water bowls spilling the contents. Not only does this create a mess and waste resources, but it leaves the animal hungry and without water creating a danger of dehydration.

Consequently, there exists a need for a device designed to provide a safe alternative for pet owners that keep their pets outside on a leash or chain that prevents accidental spillage of food and water while preventing accidental entanglement of the leash or chain while still restraining the animal. The proposed invention allows a pet owner to safely restrain their pet without the danger of the pet wrapping its leash around an anchor point. An elevated platform allows the animal to easily access food and water without the need to bend over and eat and drink directly at ground level. Additionally, the food and water containers are secured to the tether point and to the ground so that neither the leash nor the animal will be able to knock them over and spill the contents.

SUMMARY

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises an apparatus for feeding and restraining an animal while outdoors. The apparatus comprises a bowl assembly for containing food and water for the pet. The apparatus further comprises a rod for securing the bowl assembly to the ground and a ring element surrounding the rod for attaching to a leash or a chain for restraining an animal. The ring is freely pivotable around the rod preventing the leash or chain from becoming wrapped or tangled around the rod.

Furthermore, in a preferred embodiment of the invention the bowl assembly comprises a base component resembling a bowl with a center shaft extending upward out of the bowl. The bowl assembly further comprises a feeder component attachable to the base component. The feeder component comprises a bowl bisected with a divider, essentially creating two separate bowls. Water is typically placed in one side and food in the other side. The center shaft of the base component extends into the divider of the feeder component from underneath. A first end of the rod extends through the center shaft and into the divider to mechanically connect the base component to the feeder component. The apparatus further comprises a ground stabilizing element. The ground stabilizing element is generally conical in shape with a plurality of fins for driving into the ground. A second end of the rod penetrates a through hole in the ground stabilizing element and terminates deeper in the ground. The shape of the ground stabilizing element stabilizes the rod by resisting lateral movement when an animal pulls on the leash attached to the ring element to help keep the apparatus firmly anchored in the ground.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
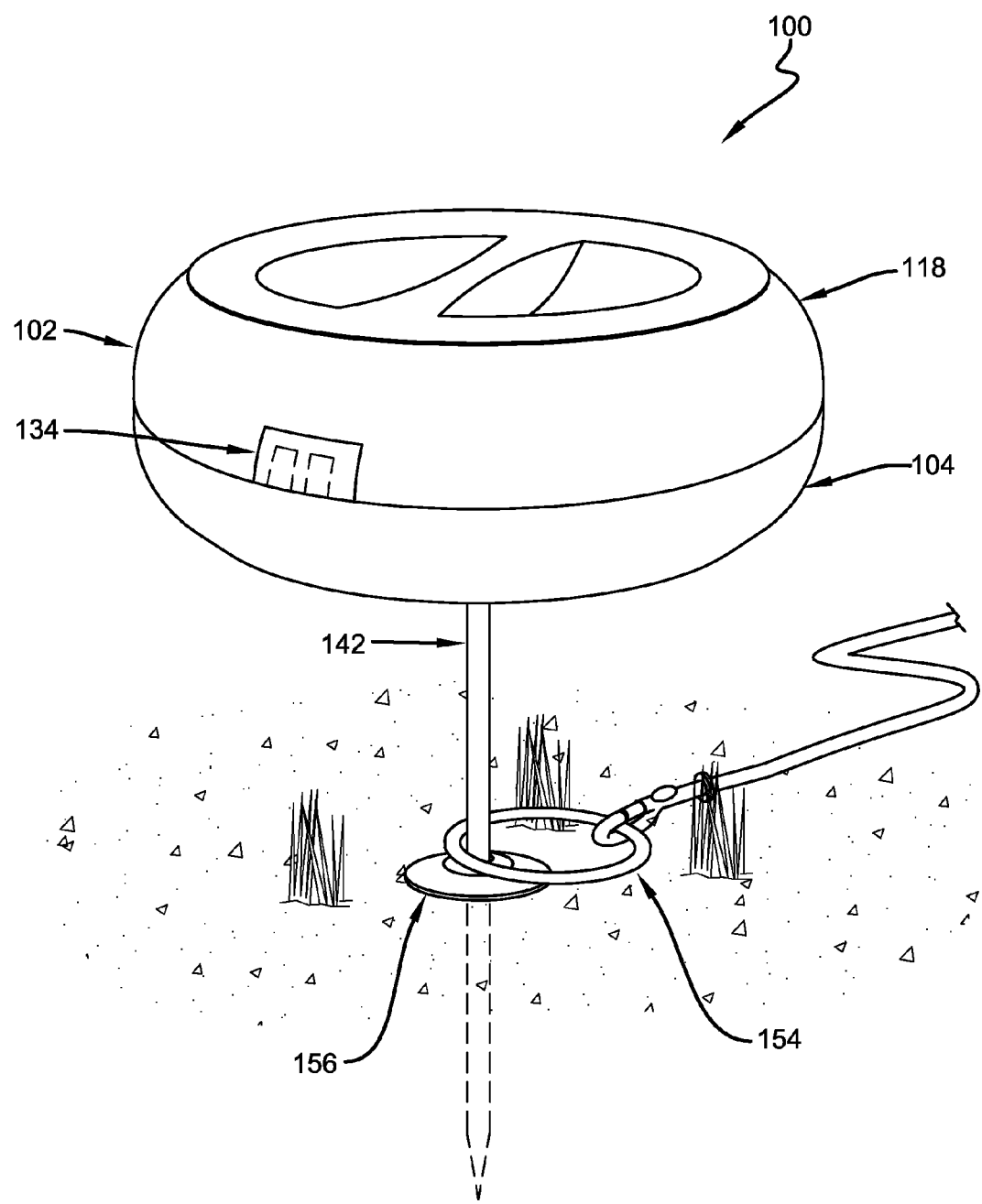
FIG. 1 illustrates a perspective view of an apparatus for feeding and restraining an animal in accordance with the disclosed architecture.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter. The invention relates generally to an apparatus for feeding and watering a pet kept outdoors while restraining the pet in a tangle-free manner.

Figure 2:
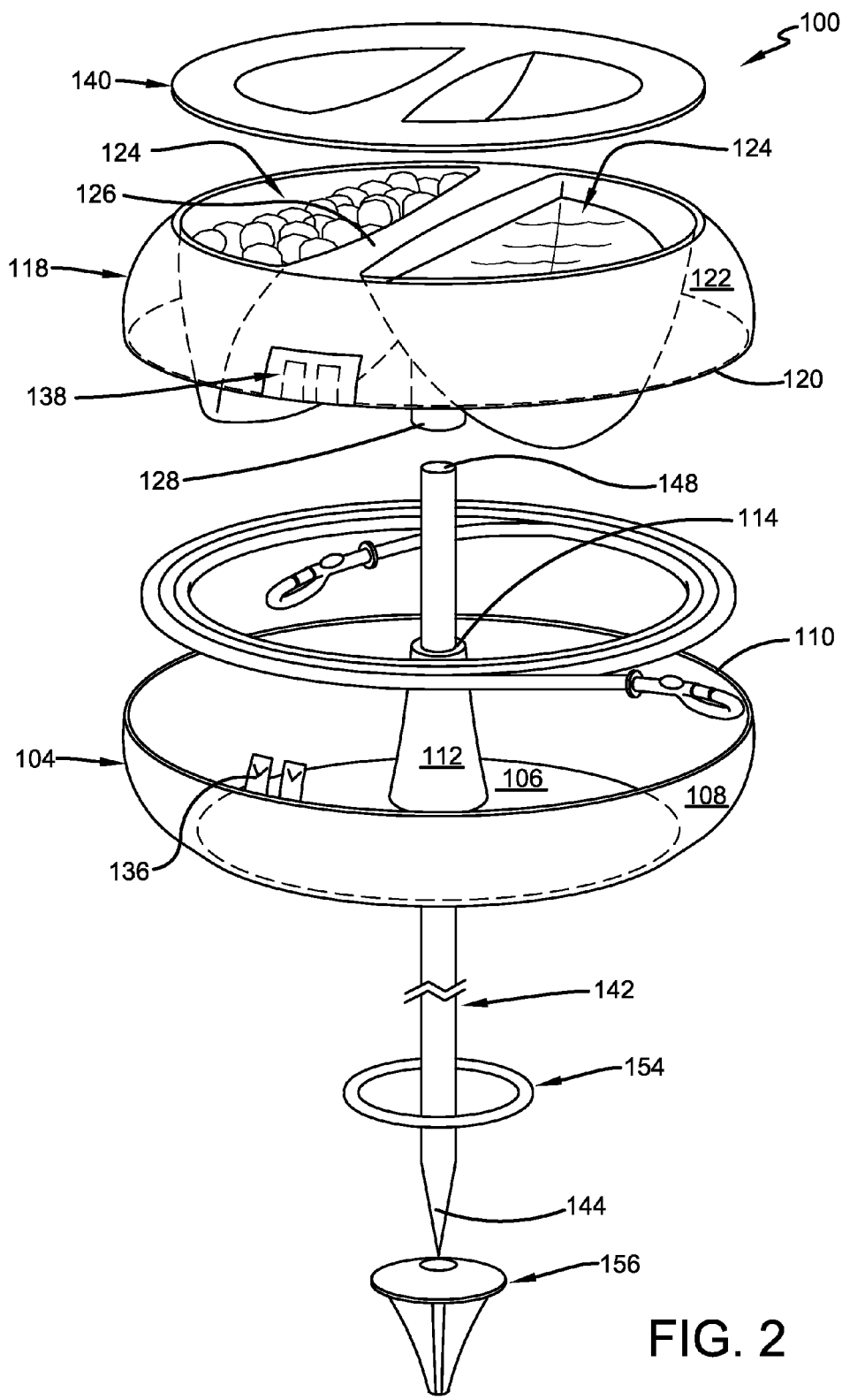
FIG. 2 illustrates an exploded view of the apparatus for feeding and restraining an animal in accordance with the disclosed architecture.

Referring initially to the drawings, FIGS. 1 and 2 illustrate an apparatus 100 for feeding, watering, and restraining an animal. The apparatus 100 is for use with any domesticated pet, such as a dog, that would be at least occasionally restrained outdoors. Typically, the dog would be on a leash or similar restraint that is attachable to the apparatus 100. The apparatus 100 is designed to prevent the leash, chain, or other restraint from becoming wrapped or tangled around a fixed point thereby limiting the pet's movement. The apparatus 100 comprises a bowl assemble 102 capable of holding food and water simultaneously, and a rod 142 capable of securing the apparatus 100 to the ground. Additionally, the apparatus 100 is configured so that the bowl assembly 102 is elevated allowing the pet to access food and water without having to bend over and eat and drink off of the ground. The apparatus 100 is tip-resistant preventing accidental spillage and waste of the food and water.

The bowl assembly 102 comprises a base component 104 and a feeder component 118. The bowl assembly 102 is typically manufactured from a molded plastic, however this is not meant as a limitation as any other suitable material known to one skilled in the art may be used without affecting the overall concept of the invention. The base component 104 comprises a closed bottom 106 extending upward into a perimeter sidewall 108 terminating in a top rim 110. The top rim 110 is typically between approximately eight and twenty inches in diameter, but may be larger or smaller as desired. The closed bottom 106 is essentially planar with a slight curvature similar to a bottom of a bowl. The sidewall 108 extends out of the closed bottom 106 to form the sides of the bowl and terminates in the top rim 110. The closed bottom 106 comprises a center shaft 112 that extends upward out of the closed bottom 106.

The center shaft 112 generally resembles a finger-like or tubular projection that rises upward out of a center of the closed bottom 106. The center shaft 112 comprises an apex 114 and preferably a through-hole 116. The center shaft 112 is sized to have a diameter large enough to receive the rod 142. In an embodiment contemplated without the through-hole 116, the rod would terminate and rest within the center shaft 112. In this embodiment, the rod 142 could have a tapered rectangular shape (not shown), and the center shaft 112 could have a corresponding tapered rectangular shape configured to fit the rod 142. This shape would be desirable as it would resist any spinning of the bowl assembly 102 around the rod 142.

In the embodiment with the through-hole 116, the through-hole 116 penetrates the apex 114 of the center shaft 112 allowing the rod 142 to penetrate and extend upward into the feeder component 118 as described infra. The center shaft 112 extends past the top rim 110 so that it can engage the feeder component 118. The base component 104 is otherwise hollow and may be used for storage when not in use.

The feeder component 118 comprises a bottom rim 120 that extends upward into an annular sidewall 122 so that it generally resembles an upside down bowl. The annular sidewall 122 encompasses a two-well bowl 124 bisected with a divider 126 integrated with the annular sidewall 122. The two-well bowl 124 extends down into the feeder component 118 with a bottom of the two-well bowl 124 extending below the bottom rim 120. The two-well bowl 124 is approximately between four and ten inches deep, but may be deeper or shallower as desired. The divider 126 is essentially hollow and configured to receive the center shaft 112 of the base component 104 and/or a portion of the rod 142 that extends through the through-hole 116 of the center shaft 112 when the bottom rim 120 of the feeder component 118 is placed atop and abuts the top rim 110 of the base component 104.

Figure 3:
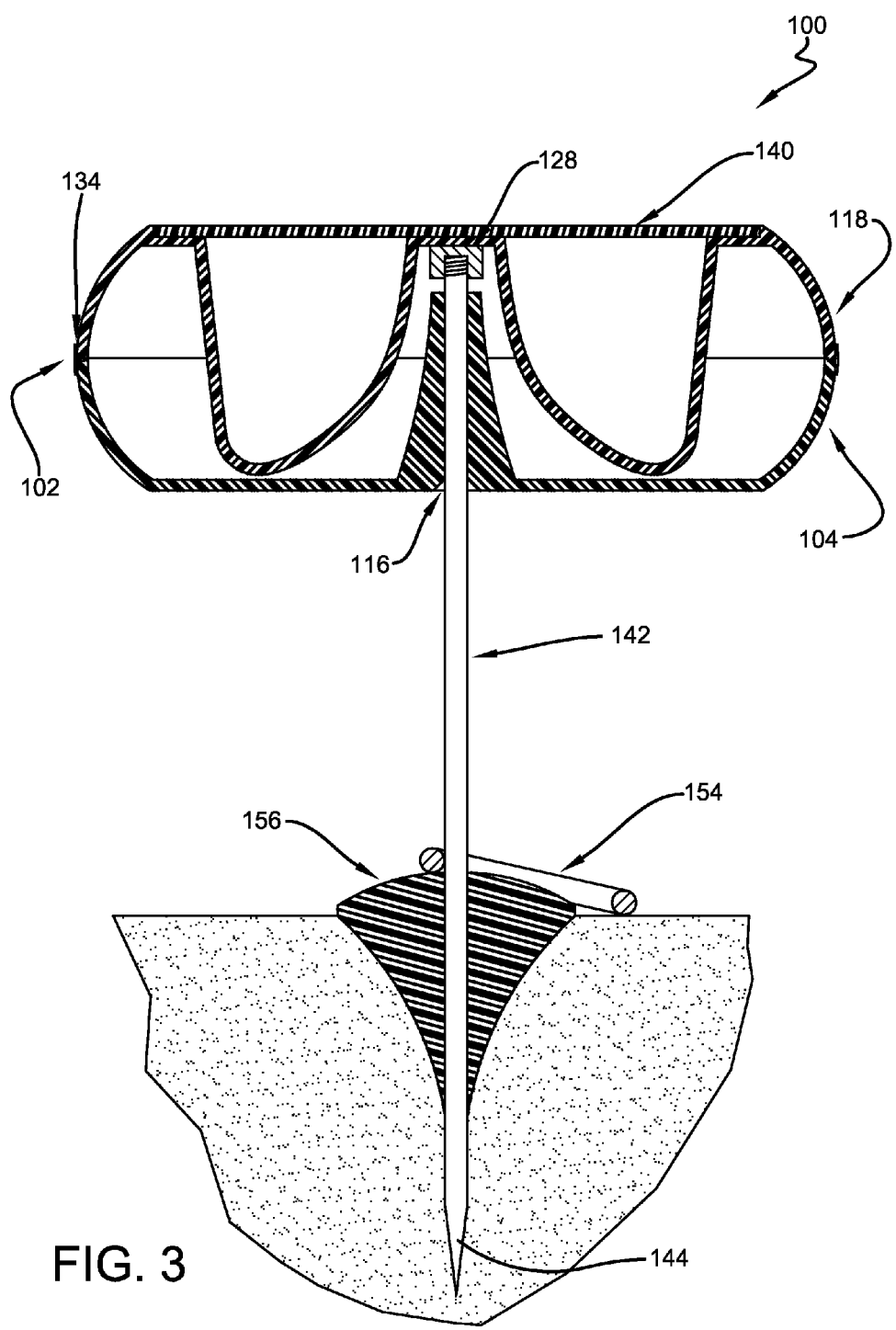
FIG. 3 illustrates a cut away view of the apparatus for feeding and restraining an animal in accordance with the disclosed architecture.

As illustrated in FIGS. 2 and 3, the rod 142 comprises a first end 144 and a second end 148. The first end 144 is for engaging the ground. The first end 144 may comprise a point, a beveled tip, a spike, a threaded bit, and auger, and the like, or any other shape that facilitates penetration into the ground. The second end 148 engages the center shaft 112 of the base component 102.

The second end 148 of the rod 142 typically penetrates the center shaft 112 of the base component 104 extending past the through hole 116 and into an underside of the divider 126 of the feeder component 118. The second end 148 may be threaded, notched, or a smooth bore. While the divider 126 is essentially hollow, it may comprise an attachment point 128 for receiving the second end 148 of the rod 142. The attachment point 128 may comprise a screw bore, a nut, a bolt nut, or any other mechanical fastener known to one of skill in the art for engaging the second end 148 of the rod 142. The attachment point 128 may be molded into, adhered, or mechanically attached to a hollow inside of the divider 126 so that the attachment point 128 essentially becomes integrated into the divider 126. Alternatively, the second end 148 may be non-circular in configuration, such as a beveled rectangular shape as discussed supra, to wedge into the center shaft 112, thereby resisting rotation or spinning of the bowl assembly 102 around the rod 142.

The bowl assembly 102 further comprises a plurality of securing elements 134. The plurality of securing elements 134 are typically clips 134 and clip holders 138 that attach to the perimeter sidewall 108 of the base component 104 and the annular sidewall 122 of the feeder component 118. The clips 134 and the clip holders 138 are typically plastic or metal and are integrated into or mechanically fastened to the perimeter sidewall 108 and the annular sidewall 122. The bowl assembly 102 may further comprise a top plate 140 for covering the two-well bowl 124 when the apparatus is not in use.

Figure 4:
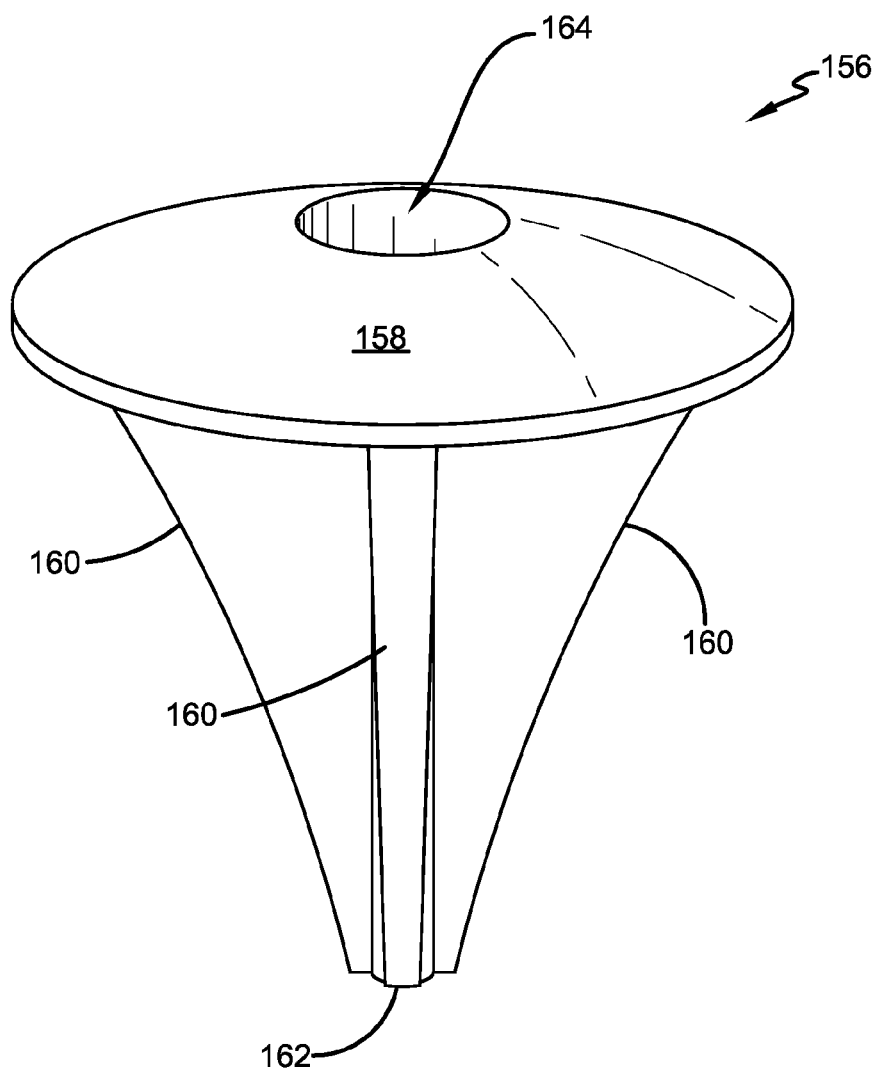
FIG. 4 illustrates a perspective view of a ground stabilizing element for the apparatus for feeding and restraining an animal in accordance with the disclosed architecture.

As illustrated in FIGS. 2-4, the apparatus 100 further comprises a ring element 154 and a ground stabilizing element 156. The ring element 154 is typically a metal ring larger in diameter than the rod 142 that freely pivots around the rod 142 between the bowl assembly 102 and the ground stabilizing element 156. A leash, chain, rope, or other tether will have a free end that may be attached to the ring element 154. Typically, the leash will simply be clipped into the ring element 154 thereby securing the pet to the apparatus 100.

The ground stabilizing element 156 comprises a planar disc 158, a plurality of fins 160, a vertex 162, and a center bore 164. The ground stabilizing element 156 generally resembles an upside down cone that can penetrate into the ground. The planar disc 158 is the top of the cone and is generally in line with or essentially flat on the ground when in place. The planar disc 158 may comprise a slightly convex shape as well. The plurality of fins 160 are generally conical or triangular in shape extending downward out of the planar disc 158 terminating in the vertex 162. The center bore 164 runs through the ground stabilizing element 156 from the vertex 162 through a center of the planar disc 158 and is of a diameter large enough so that the rod 142 may penetrate the center bore 164. The shape of the ground stabilizing element 156 is desirable as it provides lateral stability to the rod 142 when in the ground. As a lateral force is applied to the rod 142 from the animal pulling on the ring element 154, the ground stabilizing element 156 resists the lateral force preventing the rod 142 from bending over.

To assemble the apparatus 100, a user drives the rod 142 through the ground stabilizing element 156 into the ground. Although not shown, the apparatus 100 may further comprise a removable T-handle configured to engage the second end 148 of the rod 142 so that the first end 144 may be screwed or bored into the ground. Once the rod 142 and the ground stabilizing element 156 are anchored in the ground, the ring element 154 slides onto the rod 142 so that it is freely pivotable around the rod 142. Once the base component 104 is place on the rod 142, the feeder component 118 is removably attached to the base component 104 with the plurality of securing elements 134, and the bowl assembly 102 is secured to the second end 148 of the rod 142.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus for feeding and restraining an animal comprising:
   a bowl assembly comprising:
     a base component comprising a closed bottom extending upward into a perimeter sidewall terminating in a top rim; wherein the closed bottom comprises a center shaft extending upward out of the bottom; and
     a feeder component comprising a bottom rim extending upward into an annular sidewall encompassing a bowl bisected with a divider configured to receive the center shaft of the base component, wherein the bottom rim of the feeder component abuts the top rim of the base component; and
   a rod comprising a first end for engaging the ground and a second end for engaging the center shaft of the base component; and
   a ring element freely pivotable around the rod.

2. The apparatus of claim 1, wherein the first end of the rod is an auger, a bit, a beveled tip, or a point.

3. The apparatus of claim 1, wherein a shape of the second end of the rod is non-circular to prevent rotation of the bowl assembly around the rod.

4. The apparatus of claim 3, wherein a shape of the center shaft of the base component is configured to fit the shape of the second end of the rod.

5. The apparatus of claim 4, wherein the second end of the rod and the center shaft of the base component each have a tapered rectangular shape.

6. The apparatus of claim 1, further comprising a removable T-handle configured to engage the second end of the rod to screw the rod into the ground.

7. A apparatus for feeding and restraining an animal comprising:
   a bowl assembly comprising:
     a base component comprising a planar closed bottom extending upward into a perimeter sidewall terminating in a top rim; wherein the planar closed bottom comprises a center shaft extending upward out of the bottom; and
     a feeder component comprising a bottom rim extending upward into an annular sidewall encompassing a two-well bowl bisected by an integrated divider configured to receive the center shaft of the base component, wherein the bottom rim of the feeder component abuts the top rim of the base component; and
   a rod comprising a first end for engaging the ground and a second end for engaging the center shaft of the base component; and
   a ring element freely pivotable around the rod; and
   a ground stabilizing element comprising a planar disc, a plurality of fins extending out of the disc terminating in a vertex, and a center bore, wherein the second end of the rod runs through the center bore.

8. The apparatus of claim 7, wherein the bowl assembly is manufactured from a molded plastic.

9. The apparatus of claim 7, wherein the bowl assembly further comprises a top plate for covering the two-well bowl.

10. The apparatus of claim 7, wherein the second end of the rod penetrates the center shaft of the base component.

11. The apparatus of claim 10, wherein the second end of the rod comprises a screw thread.

12. The apparatus of claim 11, wherein the divider of the feeder component comprises a screw bore for receiving the second end of the rod.

13. The apparatus of claim 12, wherein the bowl assembly further comprises a plurality of securing elements attached to the perimeter sidewall of the base component and the annular sidewall of the feeder component for removably attaching the base component to the feeder component.

14. A apparatus for feeding and restraining an animal comprising:
   a bowl assembly comprising:
     a base component comprising a planar closed bottom extending upward into a perimeter sidewall terminating in a top rim; wherein the planar closed bottom comprises a center shaft extending upward out of the bottom; and
     a feeder component comprising a bottom rim extending upward into an annular sidewall encompassing a two-well bowl bisected by an integrated divider configured to receive the center shaft of the base component, wherein the bottom rim of the feeder component abuts the top rim of the base component;
   a plurality of securing elements attached to the perimeter sidewall of the base component and the annular sidewall of the feeder component for removably attaching the base component to the feeder component;

a top plate for covering the two well bowl; and a rod comprising a first end for engaging the ground and a second end for engaging the center shaft of the base component; and a ring element freely pivotable around the rod; and a ground stabilizing element comprising a disc, a plurality of conical fins extending out of the disc terminating in a vertex, and a center bore, wherein the second end of the rod runs through the center bore.

15. The apparatus of claim 14, wherein the center shaft of the base component comprises a through hole at an apex of the center shaft for allowing the second end of the rod to penetrate the center shaft and engage the feeder component.

16. The apparatus of claim 15, wherein the integrated divider comprises an attachment point for engaging the second end of the rod.

17. The apparatus of claim 16, wherein the attachment point is a bolt nut.

18. The apparatus of claim 17, wherein the attachment point is a screw bore.

19. The apparatus of claim 17, wherein the bolt nut is molded into the divider as an integral piece.

20. The apparatus of claim 19, wherein the plurality of securing elements are plastic clips integrated into the perimeter sidewall of the base and the annular sidewall of the feeder components.

* * * * *